No. 853,101. PATENTED MAY 7, 1907.
W. LOSSING.
COVER FOR COMB CARRYING BOXES.
APPLICATION FILED JAN. 16, 1906.
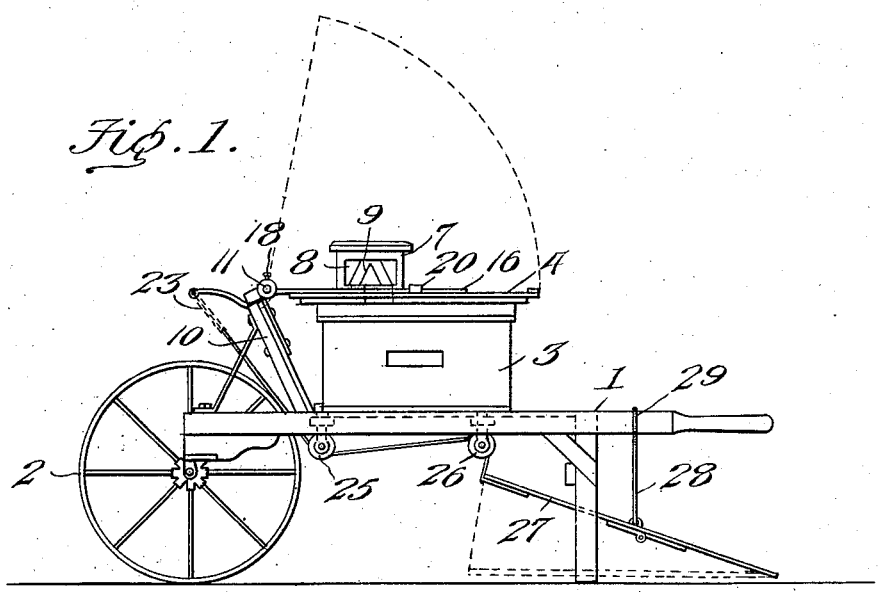
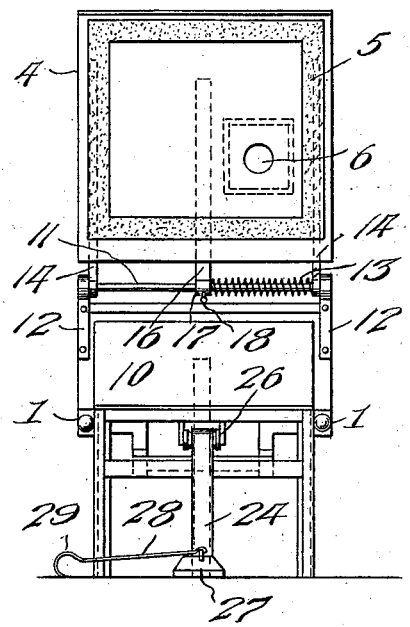
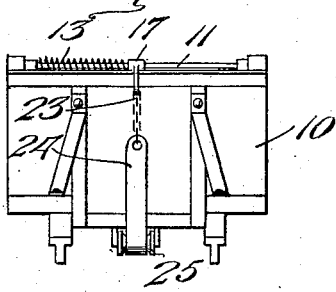
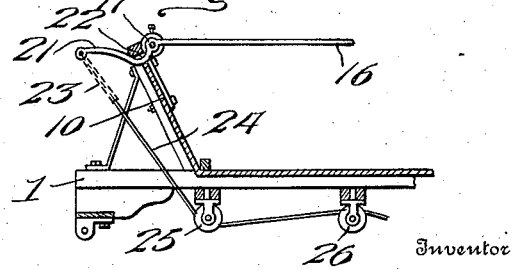
Witnesses
Frank B. Hoffman
Inventor
William Lossing
By Victor J. Evans
Attorney

UNITED STATES PATENT OFFICE.

WILLIAM LOSSING, OF PHŒNIX, ARIZONA TERRITORY.

COVER FOR COMB-CARRYING BOXES.

No. 853,101.  Specification of Letters Patent.  Patented May 7, 1907.

Application filed January 16, 1906. Serial No. 296,437.

*To all whom it may concern:*

Be it known that I, WILLIAM LOSSING, a citizen of the United States, and a resident of Phœnix, in the county of Maricopa and Territory of Arizona, have invented certain new and useful Improvements in Covers for Comb-Carrying Boxes, of which the following is a specification.

This invention relates to bee traps, and one of the principal objects of the device is to provide a box or receptacle to be mounted upon a wheeled frame or wheelbarrow for conveying honeycomb frames to bee hives and for removing the honey frames and replacing them with the comb frames, said box or receptacle having a cover normally closed by a spring, and a bee trap mounted upon said cover to entrap robber bees which may enter the receptacle during the time the cover is raised for gaining access to the interior of the receptacle.

Another object of the invention is to provide a cover for the receptacle having a spring to close the same, and a foot lever for opening said cover, thus permitting the operator to use both hands in transferring the contents of the receptacle to the hives and the honey frames to the receptacle.

Another object of the invention is to provide a bee trap upon the cover which will cage such robber bees as may have made an entrance to the receptacle during the time the cover is lifted from the receptacle.

Still another object of the invention is to provide means for closing the cover tightly upon the receptacle to prevent the odor of the honey from attracting robber bees.

These and other objects may be attained by means of the construction illustrated in the accompanying drawing, in which:

Figure 1 is a side elevation of an appliance made in accordance with my invention, said figure showing in dotted lines, the position of the cover when opened or raised and the foot lever when depressed for raising said cover. Fig. 2 is a rear end elevation of the same showing the cover elevated or raised from the receptacle. Fig. 3 is a front end elevation of the device with the wheel removed. Fig. 4 is a central longitudinal section of the supporting frame, and showing the cover operating devices in elevation.

Referring to the drawing for a more particular description of my invention, the numeral 1 designates the handle bars of a wheel barrow, and 2 is the wheel thereon. It will be understood that any suitable wheel barrow or wheeled frame may be used for conveying the appliance from place to place.

Mounted upon the wheel barrow frame is a box or receptacle 3 of any suitable size or shape designed for containing a series of comb frames or honey frames. A cover 4 is provided with a sealing strip of felt 5 upon its under side designed to rest upon the upper edge of the receptacle 3 to prevent the odor of honey escaping from the receptacle to attract robber bees. An aperture 6 is formed in the cover 4, and a bee trap 7 is superposed above the aperture 6, said trap comprising a suitable frame 8 made of wire gauze, and located within said cage or trap immediately above the opening 6, are conically formed wire bee traps 9. Upon the dashboard 10 of the wheel barrow a shaft 11 is journaled in suitable brackets 12 and encircling said shaft is a spiral spring 13, one end of which is secured to the shaft 11, and to the dash board 10. Two hinge bars 14 are used, one upon each side of the cover. A bar 16 provided with a sleeve 17 connected to the shaft 11 by means of binding screw 18 is secured to the top of the cover 4 by means of keepers 20. Extending from the sleeve 17 is a curved lever 21, said lever extending through an opening 22 in the dashboard of the barrow, and connected to the forward end of said lever 21 is a chain 23, to the lower end of which a strap or belt 24 is connected, said strap or belt extending under a pulley 25 supported from the frame of the wheel barrow and extending below the handle bars 1. From the pulley 25 the belt 24 extends over a similar pulley 26, and from thence extends downward and is secured to a foot lever 27. The foot lever 27 is provided with a hooked rod 28, the upper hooked end 29 of which is designed to engage one of the handle bars of the wheel barrow to support the foot lever when the wheelbarrow is being moved from place to place.

The operation of my invention may be briefly referred to as follows: When it is desired to gain access to the receptacle for the purpose of removing the comb frames or inserting honey frames, the foot of the operator is placed upon the lever 27, and the cover 4 is raised to the dotted line position in Fig. 1, thus giving the use of both hands of the operator for removing and replacing the frames within the receptacle 3. Upon removing his foot from the lever 27 the cover automatically closes and should any robber bees gain access to the receptacle during the time the cover is raised they will immediately seek the light afforded by the wire gauze frame 8 and be effectually trapped within the cage 7.

Having thus described the invention, what I claim is:

1. In a device of the character described, a receptacle, a cover therefor, a spring for holding said cover upon the receptacle, a bee trap mounted upon said cover and communicating with said receptacle through an opening therein, and a foot lever for raising said cover, substantially as described.

2. In a device of the character described, a wheeled frame, a receptacle mounted thereon, a cover for said receptacle, said cover provided with an aperture therein communicating with the receptacle, a bee trap mounted over said aperture, a shaft mounted in the wheeled frame, a bar connected to said shaft and to said cover, a spiral spring surrounding said shaft, and exerting its tension to close said cover, a lever for operating said shaft and opening said cover, a foot lever, and connections between said foot lever and said lever, substantially as described.

3. In a device of the character described, a receptacle, a cover therefor, said cover having a felt sealing strip thereon, said cover having an aperture therein communicating with the receptacle, a superposed bee trap, means for normally closing said cover upon the receptacle, and a foot lever for raising said cover, substantially as described.

WILLIAM LOSSING.

Witnesses:
SIDNEY P. OSBORN,
GEORGE KIRKLAND.